United States Patent [19]
Hillstrom et al.

[11] Patent Number: 4,580,361
[45] Date of Patent: Apr. 8, 1986

[54] DISPLAY TENSIONING FRAME

[75] Inventors: Kevin D. Hillstrom, Northville; James R. Seely, Rochester, both of Mich.

[73] Assignee: Marketing Displays, Inc., Farmington Hills, Mich.

[21] Appl. No.: 750,498

[22] Filed: Jul. 1, 1985

Related U.S. Application Data

[62] Division of Ser. No. 602,480, Apr. 20, 1984, abandoned.

[51] Int. Cl.⁴ ............................................. G09F 17/00
[52] U.S. Cl. ...................................... 40/603; 40/156; 40/590; 40/591; 40/624; 160/378; 350/117
[58] Field of Search ................. 40/603, 590, 591, 156, 40/604, 610, 615, 616, 617, 624, 607; 160/378; 350/117

[56] References Cited

U.S. PATENT DOCUMENTS

| | | | |
|---|---|---|---|
| 1,484,231 | 12/1922 | Pistocco | 40/603 |
| 1,882,454 | 10/1932 | Spalding | 160/378 |
| 2,882,633 | 4/1959 | Howell | 40/156 |
| 3,310,901 | 3/1967 | Sarkisian | 40/156 |
| 3,885,335 | 5/1975 | Egermayer | 40/156 |

FOREIGN PATENT DOCUMENTS

| | | | |
|---|---|---|---|
| 529802 | 7/1954 | Belgium | 40/603 |
| 339325 | 12/1930 | United Kingdom | 40/603 |
| 479913 | 7/1938 | United Kingdom | 350/117 |
| 519632 | 4/1940 | United Kingdom | 350/117 |
| 893632 | 4/1962 | United Kingdom | 350/117 |

Primary Examiner—Robert P. Swiatek
Assistant Examiner—James Hakomaki
Attorney, Agent, or Firm—Harness, Dickey & Pierce

[57] ABSTRACT

A frame device for holding and displaying sign panels. The panels are held in tension along the edges by spring-biased slide means. The slide means along each side are all moved to prespecified positions for changing the sign panels when the covers of the frame device sections are opened. Similarly, all of the slide means are placed in tension simultaneously along each side when the covers are closed. Large sign panels are held in place without adverse buckling and tearing and the mounting and removal of them is faster, more convenient and more practical.

26 Claims, 18 Drawing Figures

DISPLAY TENSIONING FRAME

This is a division of application Ser. No. 602,480 filed Apr. 20, 1984, now abandoned.

BACKGROUND AND SUMMARY OF THE INVENTION

The present invention relates generally to sign frames and poster display devices for use in displaying large signs and displays. More particularly, the invention relates to display frames for securely holding in place large signs (on the order of 3–5 feet or larger on each side) and which provide means for accommodating stretching (expansion and/or contraction) of the sign or poster in the frame.

There are numerous sign frames and poster display devices known today which are used for displaying various signs and messages for advertisement and information to the public. The present invention has as its primary purpose the design of a sign frame and poster display device which can be used for displaying large signs which are several feet in length along each edge and in which the signs and displays are typically exposed to temperature and/or weather conditions which will alter the shape of the signs and displays. Large signs made of plastic or similar material, can expand or contract a considerable amount (e.g., a half-inch or more for every ten feet in length) and this can adversely affect the aesthetics and readability of a large sign or display as well as the integrity of the sign panel itself. This is particularly true where the signs are displayed outdoors and subjected to extremes in temperatures, where the signs are highlighted or backlighted and subjected to changes in temperatures, or where the signs are placed on moving vehicles and are also exposed to significant wind forces.

One of the primary purposes of the present invention is to provide a sign and poster display frame for use on the sides of truck trailers. Truck trailers typically have sides which have a surface area on the order of 6–8 feet in heighth and 15–45 feet in length. The sides of truck trailers are not used to a significant extent today for advertising purposes; instead most trailers carry either the name of a trucking company or the business entity which owns the trailer. Some similar trucks used in metropolitan areas to deliver beverages, and some busses and taxicabs, often have posters or signs mounted on them, but these are usually of a small size and are not exposed to the weather and wind conditions encountered with highway truck trailers.

It would be possible to permanently paint advertising messages on truck trailers in a manner similar to billboards, but this would be expensive and also would be difficult to change quickly on a regular basis. Also, painted surfaces have a tendency to chip or peel and the paint might not adhere effectively or efficiently to the metal sides of truck trailers. In addition, many truck trailers have posts or other structures on their sides which would create a nonuniform and uneven appearance for an advertisement.

If large canvas or plastic sheets of material were fastened on the sides of the truck trailers or other large surfaces, they would be exposed to the wind and thermal forces which would cause them to wrinkle and buckle making the message both unsightly and difficult to read. To prevent this, the posters and sign displays would have to be secured tightly initially which would only increase the problems when the signs and posters were exposed to wind and thermal expansion and contraction problems. In addition, in cold weather conditions, the thermal contraction of large pieces of plastic if held tightly on the perimeter might result in a cracking or tearing of the sign which would ruin it. If a crack or tear developed in the sign and it was exposed to high speed wind conditions, the resultant effect on the sign would be disasterous. Not only would the sign not present the intended message to the public, but the hanging and flapping portions could create safety problems.

Another primary purpose of the invention is to provide a display frame for use with lighted sign devices. In large lighted advertising displays today, especially those in which the sign panels are backlighted, special care has to be taken to prevent warping, buckling or distortion of the sign panels. Lights produce a significant amount of heat energy which expands the sign panels and adversely affects the aesthetics and readability of the message on the sign. In large backlighted displays, the sign panel is typically sandwiched between two panels of glass or plexiglass (acrylic) in order to prevent such distortion. These displays are heavy and expensive, however, and also make changing of the sign panels time consuming and difficult. Plexiglass further gets dirty and marred quickly and thus needs to be replaced frequently.

It is the main object of the present invention to provide a sign frame and poster display device which overcomes all the aforementioned problems. It is another object of the present invention to provide a display frame which will securely hold and accommodate large sign and poster displays on the order of several feet along each edge. It is still a further object of the present invention to provide a sign frame and poster display device which can compensate for the thermal expansion and contraction forces on large sign displays and also hold the sign and poster so that it can accommodate large wind forces if it is attached to a moving vehicle.

It is still another object of the invention to provide a sign frame and poster display device for large signs and posters which allows the sign or poster to be quickly and easily changed when desired. Another object of the invention is to allow use of a large disposable sign which is economical to produce and can be changed frequently.

In accordance with the present invention, a sign frame and poster display device is provided which has means for holding the sign or poster securely on all of its edges and yet at the same time allows for expansion and contraction of the sign due to wind and thermal forces. The sign frames and poster display devices can be of any length and width and comprise a plurality of elongated sections positioned on the side of the truck trailer or other planar surface as desired. Each of the frame sections has a base member and a hinged cover member which are pivoted together along their outside edges. A slide member is resiliently mounted inside the base member and is adapted for movement in any direction in a plane parallel to the sign and poster surface. A plurality of the resiliently mounted slide members are provided in each of the elongated frame sections. Each of the slide members has a post or peg which is adapted to mate with corresponding apertures near the perimeter of the poster or sign display.

The cover member is adapted to be pivoted into an open position in order to allow mounting of a new sign or changing of an old sign. The cover member is also adapted to be rotated into a closed position over the edge of the sign thereby hiding the slide member and also securing the sign from unwanted removal from the frame.

Each of the frame sections also has a plurality of leaf springs or similar resilient biasing members which bias the cover into its open and closed positions. The positioning of the pivot between the cover member and the base member in cooperation with the spring biasing member creates an over-center force which securely holds the cover member in its open and closed positions.

Further objects, features and advantages of the present invention will become apparent from a review of the drawings when read in accordance with the accompanying specification.

DESCRIPTION OF THE PREFERRED EMBODIMENTS

Figure 15:
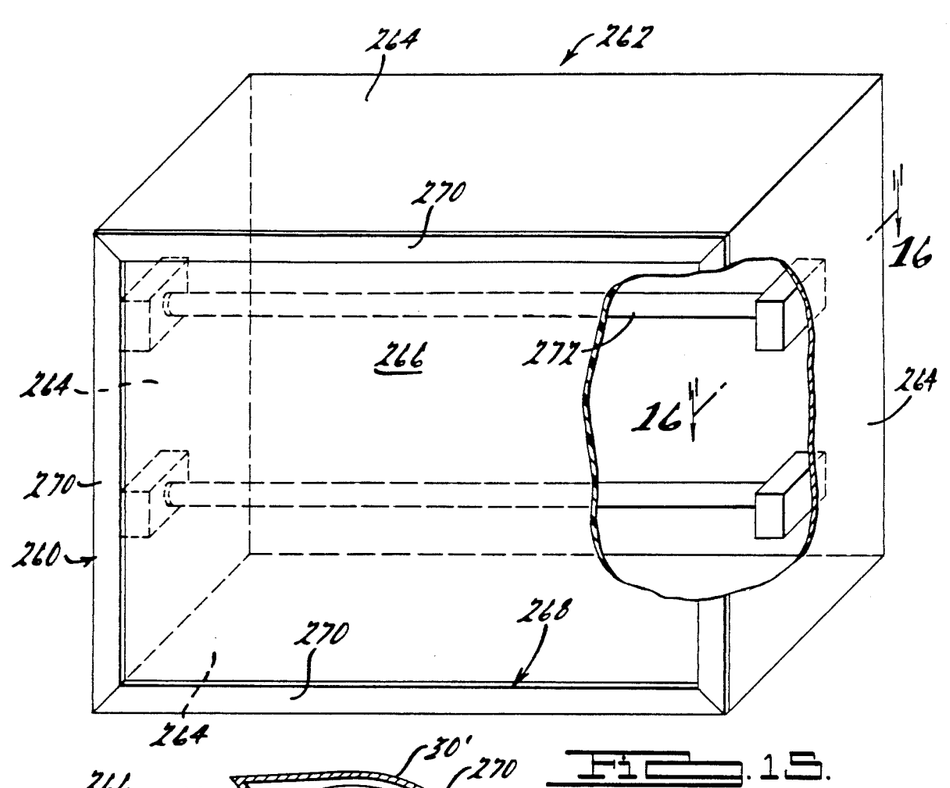
FIG. 15 shows the use of the present display tensioning sign frame invention with a backlighted display device.
Figure 16:
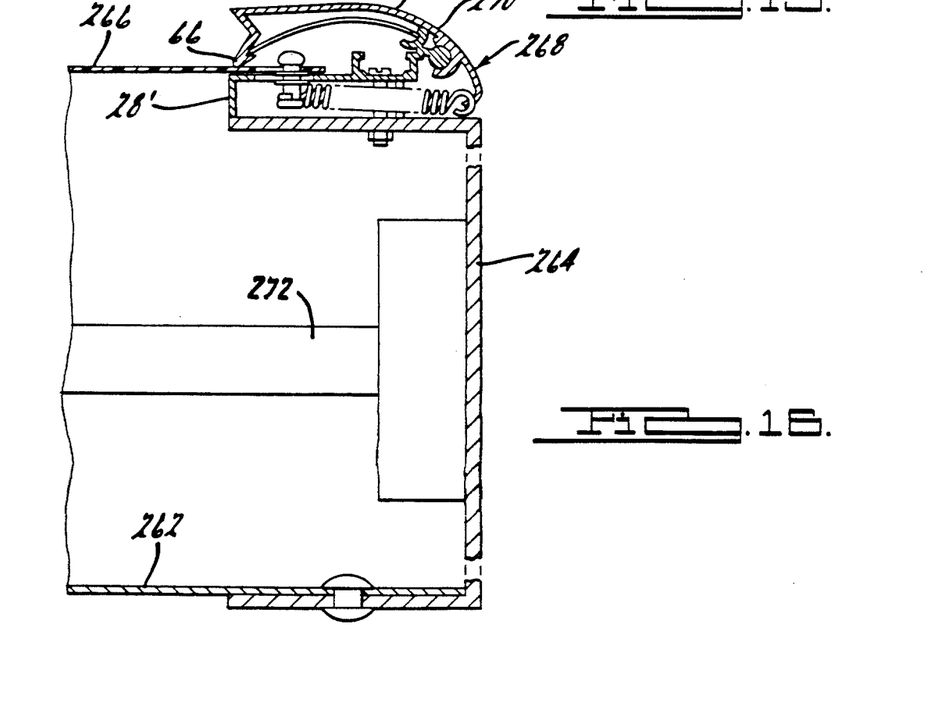
FIG. 16 is a cross-sectional view of the backlighted sign display device of FIG. 15, taken along the lines 16—16.

FIGS. 1-4 illustrate the presently preferred embodiment of the invention. As indicated above, the present invention has particular applicability for use in displaying advertising signs and posters on the sides of truck trailers 20 such as that shown in FIG. 1. It is understood, however, that the present invention is not limited for use on truck trailers or other vehicles, but has multitude of uses whenever it is desired to hold and display changeable signs and posters which need to be held tightly in place and yet have some allowance for expansion and contraction of the sign and poster itself. The present invention can be used, for example, on walls or building surfaces, on railroad cars, on billboards, in highlighted or backlighted advertising displays, etc. As indicated earlier, one of the main uses of the invention is for lighted sign displays and one embodiment thereof showing use of the present invention in a backlighted display device is shown in FIGS. 15 and 16 (discussed infra).

For ease of reference herein, the "sign frame and/or poster display device" will be referred to herein by the term "sign display frame". Similarly, the "sign or poster" means which is mounted in the sign display frame will be referred to herein by the term "sign panel". These terms are not meant to be used in any limiting manner, but simply to provide for ease of reference in describing the invention.

Figure 1:
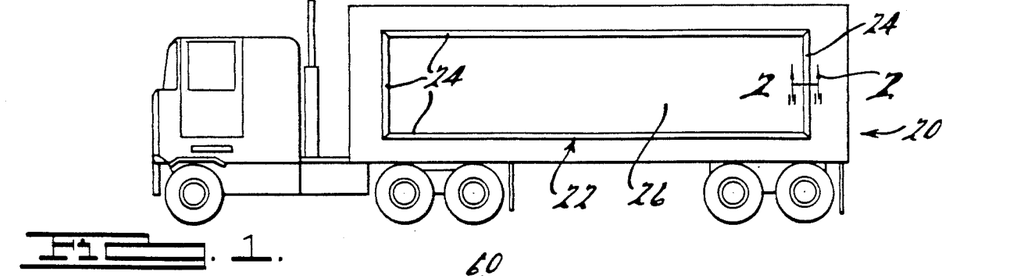
FIG. 1 shows the use of the present display tensioning sign frame invention on the side of a truck trailer.

The sign display frame 22 typically comprises a rectangular or other polygon figure and consists of a plurality of frame sections 24. Each of the frame sections 24 is secured to the truck trailer 20 or other backing surface in a fixed manner, such as by standard mechanical fasteners. If the surface is uneven or irregular, various methods known in the art can be used to provide a flat surface for mounting of the sign display frame 22 or for filling in the openings and irregularities.

The corner intersections between the frame sections 24 are mitered at an appropriate angle (typically 45°) to form an attractive and complete frame 22. The frame sections 24 also preferaby are held together in the corners by L-shaped corner braces or the like (not shown) which are commonly used in the art to hold together portions of sign display frames.

A sign panel 26 is mounted and displayed in the center of the frame 22 on the side of the truck trailer 20 or other surface.

Figure 2:
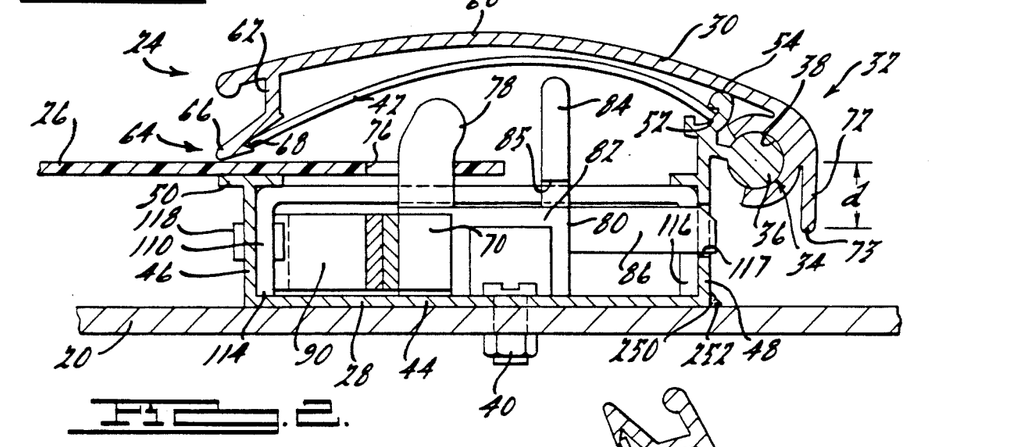
FIG. 2 is a cross-sectional view of the sign frame mechanism shown in FIG. 1, taken along lines 2—2.
Figure 3:
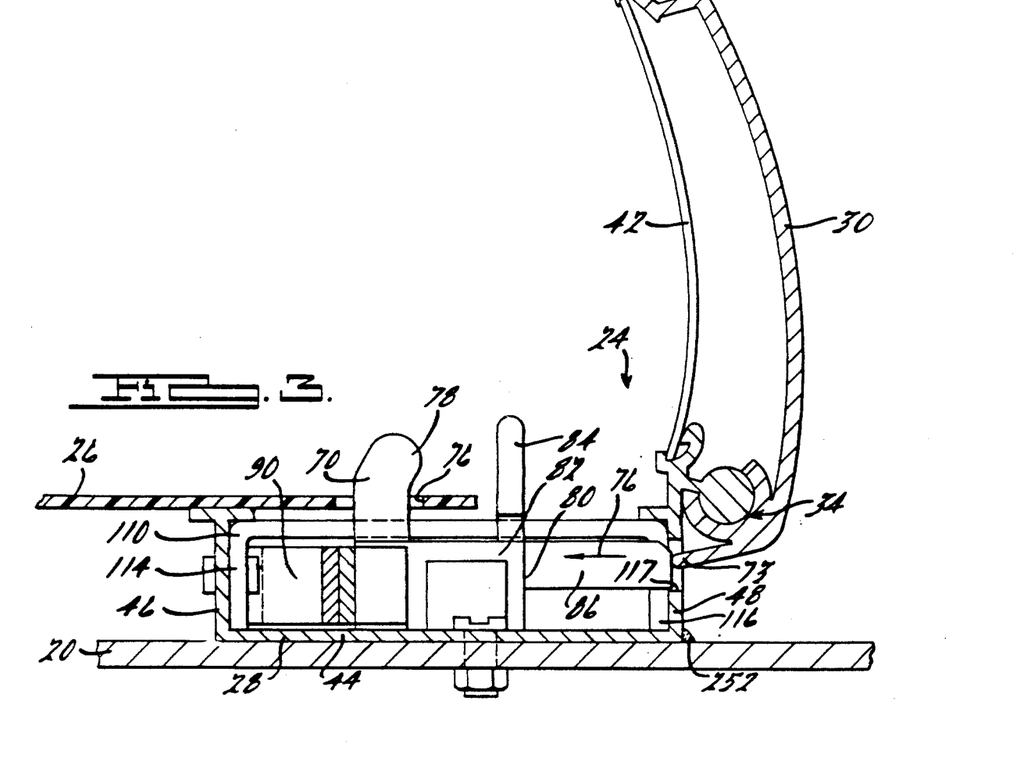
FIG. 3 shows the sign frame mechanism of FIG. 2, but in its open position.

Each of the frame sections 24 comprises two members, a base member 28 and pivoting cover member 30. The base and cover member 30 are hinged or pivoted together at one end 32, such as by a mating ball and socket mechanism 34 as shown in FIGS. 2 and 3. For the ball and socket structure, the ball member 36 is preferably formed as part of the base member 28 while the mating socket member 38 is formed as part of the cover member 30. It is also possible for the ball and socket members to be reversed, i.e., for the ball member to be incorporated in the cover member and the socket member to be part of the base member. It is also understood that any type of conventional pivoting or hanging mechanism can be used to connect the cover member 30 and base member 28 together and allow them to rotate relative to one another.

As indicated above, the base member 28 of each frame section 24 is secured by mechanical fasteners such as screws or bolts 40 to the trailer 20 or other mounting surface. Each of the frame sections 24 is connected at a plurality of positions along the length of the base members 28.

The base members 28 and cover member 30 are each preferably formed of an aluminum extrusion and are preferably extruded in the cross-sectional shapes shown in FIGS. 2 and 3. The base and cover members are biased into their "closed" position as shown in FIG. 2, and biased into their "open" position as shown in FIG. 3, by a metal leaf spring 42 or equivalent biasing member. A plurality of biasing members 42 are positioned in each of the frame sections 24 at spaced intervals along the length thereof and provide the biasing force which holds the cover member in its open and closed positions.

Due to the spaced relationship of the pivot point of the biasing member 42 relative to the pivot point of the pivoting mechanism 34 between the cover and base members, an over-center biasing force is developed. The over-center force provides a biasing force securely holding the cover member 30 in the position shown in FIG. 2 relative to base member 28 when the cover member is pivoted or swung downwardly into its closed position. A similar over-center force is developed when the cover member 30 is in its open position, as shown in FIG. 3. This over-center force holds the cover member 30 in its open position and allows the insertion or changing of the sign panel 26 in a more efficient and ready manner. For example, if the cover member 30 were not held in its open position in some manner, then a separate latch or other mechanical structure would have to be used, or the person opening the frame would have to hold the cover member open with one hand and try to insert the large poster with just his or her other hand.

Sign display frames which have biased and pivoting base and cover members are shown in U.S. Pat. Nos. 3,310,901 and 4,145,828. Both of these patents are assigned to the same assignee as the present invention.

The base member 28 comprises a U-shaped channel with a flat bottom member 44 and two upstanding side members 46 and 48. One side member 46 has a flange 50 on its upper end which acts to support the sign panel 26 when it is placed in the frame section 24. The other side member 48 has the ball member 36 (previously described) thereon, as well as channel 52 on its upper end. The channel 52 is curved or arcuate in shape and holds one end of each of the biasing members 42. The channel 52 also acts as the pivot point for the biasing member 42 when the frame section 24 is open and closed. The end portion 54 of the side member 48 which is situated above and adjacent to the channel 52 is adapted to mate with the cover member 30 and act as a "stop" as will be described in more detail below.

The cover member 30 comprises a main portion 60 with the socket member 38 at one end and a flange member 62 at the other end. As indicated above, the socket member 38 is adapted to mate with the ball member 36 on the base member 28 and form the pivoting ball-and-socket mechanism 34. The flange member 62 extends downwardly from the central portion 60 toward the sign panel 26, but the end 66 of the flange 62 is prevented from touching or resting upon the sign panel by means of the stop 54. When the sign panel 26 is mounted in the sign display frame 22, it is preferred that the cover member 30 not rest directly upon the sign panel. It is possible, however, to modify or eliminate the stop 54, or extend the length of the flange member 62 in order to allow the cover member 30 to rest upon the sign panel and help hold it in place.

When stop 54 is utilized, a small gap 64 is formed between the end 66 of the flange member 62 and the sign panel 26. This gap eliminates friction on the surface of the sign panel which would be caused by the cover member and which might hinder the effect of the resilient slide members to stretch the side panel in the intended manner. The gap 64 is relatively small, however, in order to prevent dirt and other debris from entering into the frame section 24. The close proximity of the end 66 of flange member 62 to the surface of the sign panel 26 prevents the sign panel 26 from being moved off the post or peg member 70 on which it is hung. The end 66 of the flange member 62 also has a channel member 68 formed in it which is adapted to receive one end of each of the spring biasing members 42. In this manner the biasing members 42 are tightly positioned in tension between the channel 68 in the cover member 30 and the channel 52 in the base member 28. The biasing members 42, which are substantially flat in their unstressed condition, are inserted in position in the frame section 24 and assume a bowed configuration which helps supply the necessary biasing force between the base and cover members.

Adjacent the socket member 38 on the cover member 30 is a protruding elongated flange member 72. The length "d" of the flange 72 is determined so that when the cover member 30 is rotated into its opened position (FIG. 3), the end 73 of the flange member 72 strikes and pushes against the slide member 80 (actually against post member 86 of the slide member 80) and moves it in a direction indicated by arrow 76. When the cover members 30 and thus frame sections 24 are in their open positions, the frame 22 and frame sections 24 are in position for insertion, removal or change of the sign panel 26. (The full operation of the display tensioning frame is described in more detail below.)

The sign panel 26 has a plurality of openings 76 around its perimeter which are situated and positioned to mate with the post members 70 on the slide members 80. Also as shown in FIGS. 2 and 3, the post members 70 have upper portions 78 which are tilted at an angle from the vertical toward the ball and socket mechanism 34 and act to help hold the sign panel 26 in place when it is positioned over the top of the posts 70.

Figures 4, 4A, 4B, 5:
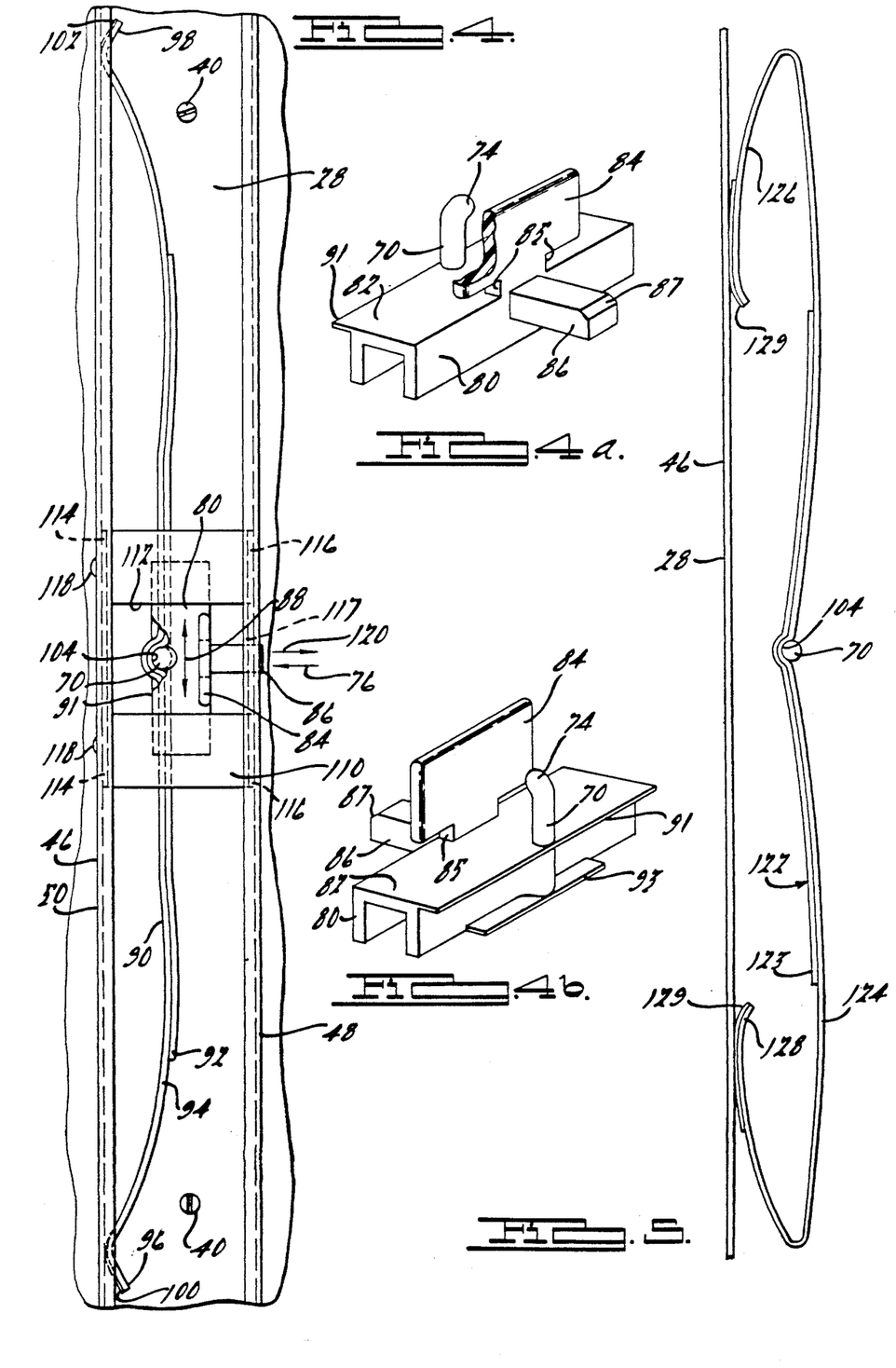
FIG. 4 is a partial top plan view showing the spring-biasing member and the slide member.
FIGS. 4a and 4b are perspective views of the slide member.
FIG. 5 illustrates an alternate embodiment of the spring-biasing member for use with the present invention.

The slide members 80 are best shown in FIGS. 4, 4a and 4b in combination with FIGS. 2 and 3. The slide member 80 is preferably made of an injection molding grade of a thermoplastic material, such as high impact polypropolene, and has a main body portion 82, an integrally formed upstanding peg or post member 70, a protruding lever member 84 and a rearward extending post member 86.

The slide member 80 is situated on the bottom member 44 of the base member 28 and is adapted to slide 360° in any direction in a plane parallel to the bottom member 44 and thus parallel to the sign panel 26. The lever member 84 is used to manually adjust the slide member 80 lengthwise in the frame section 24 (as indicated by the arrow 88 in FIG. 4) so that the post member 70 can be positioned and aligned to fit within one of the openings 76 in the sign panel 26 when the sign panel is being mounted in the frame.

An opening 117 is provided in side member 48. The opening 117 allows flange member 72 to make contact with the post member 86 and mate with the slide member 80. The opening 117 also has sufficient width to allow the slide member 80 to travel the prespecified distance lengthwise in frame section 24 (i.e., in the direction of arrow 88 in FIG. 4). Chamber 87 is provided on the end of post member 86 to insure that it will slide easily through opening 117.

An elongated spring mechanism 90 is positioned in the frame section 24 and is adapted to mate with and bias the slide member 80 and also provide the appropriate tension for the sign panel 26. The spring mechanism 90 is comprised of two tempered steel leaf springs 92 and 94, a main leaf spring member 94 and a supporting or stiffening shorter leaf spring member 92. The ends 96 and 98 of the spring member 94 are bent reversely upwardly so that the spring mechanism 90 will rest easily on the side member 46 of base member 28 and readily slide therealong. To ensure ease of sliding movement of the spring member 90 relative to the base member 28, antifriction means 100 and 102 are positioned on the bent end portions 96 and 98 where they mate with and rest against the side member 46. Preferably, the antifriction means 100 and 102 comprises ultra high molecular weight polymer tape, although any other equivalent antifriction material or structure could be utilized, such as plastic cap members, ball bearing mechanisms, etc.

The spring member 90 has a channel 104 formed in its center which mates with and holds the post member 70 of the slide member 80. The channel 104 maintains the appropriate relative positions of the slide member and spring member and insures a uniform and consistent biasing force in each frame section. The spring member 90 is also calculated to provide spring forces which will firmly hold the sign panel 26 in tension at all times and yet allow the sign panel to expand and contract a significant extent.

The slide member 80 and spring member 90 are also held in their relative positions in the frame section 24 by means of a pair of U-shaped support members 110. Support members 110 extend the width of the channel in the base member 28 and are separated leaving an opening 112 through which post member 70 and lever member 84 extend. Each of the support members 110 has two downwardly extending side flanges 114 and 116 which fit inside the side walls of the base member 28. A pop rivet 118 or other appropriate fastener is used to hold each of the support members 110 securely in place. The support members 110 are preferably made of aluminum or other sheet metal. Lever member 84 has slots 85 therein which are adapted to fit over support 110 when the slide member 80 is moved in either direction along the length of frame section 24 (in the direction of arrow 88).

The slide member 80 preferably has a pair of ledges or flanges 91 and 93 thereon. The ledges 91 and 93 insure that the spring member 90 mates and seats properly with the slide member, and also eliminate any possible frictional forces if the metal spring member 90 were to rest and slide against either the bottom 28 of metal frame section 24 or the underside of the metal U-shaped support members 110. Ledge 91 extends substantially the full length of slide member 80 so that it will not catch with the edge of opening or space 112 and hinder the operation of the tensioning mechanism.

In operation, the plastic slide member 80 with the post member 70 thereon are moved into their "open" positions when the cover member 30 is opened. The flange member 72 on the cover member hits and pushes against the post member 86 on the slide 80 and slides it in the direction of the arrow 76 as shown in FIGS. 3 and 4. This pushes the post member 70 against the biasing force of the spring member 90. When the frame sections 24 are positioned as part of a frame 22, the "open" positions provide a prespecified distance between oppositely positioned post members 70 on opposite sides of the frame 22. The prespecified distance is determined in combination with the size and shape of the sign panel 26; the openings 76 along the edges of the sign panel are set so that the sign panel can be inserted in the frame when the frame is in its open position. When the sign panel 26 is inserted in place in the frame 22, all of the openings 76 around the perimeter of the sign are mounted over corresponding post members 70 in the frame sections.

After the sign panel is mounted on the post members, the cover member 30 is rotated downwardly into its "closed" position (FIG. 2). This releases the force applied to the post member 86 and allows the force of the spring member 90 to bias the post members 70 in the direction of the arrow 120 which is opposite to that of arrow 76. This automatically provides a tensioning force at one time along the edges of the sign panel 26. The tensioning force is first applied along one edge as the first frame section is closed, and then along the other edges as each frame section in turn is closed. When all of the frame sections are "closed", the tensioning force is spread out uniformly and evenly over the entire surface of the sign panel 26. Since the sign panel 26 is being tensioned in this manner on all of its sides, it is stretched and held tightly in place in the frame 22 and presents an unwrinkled and planar surface for presentation of a message.

Preferably, the sign panel 26 is made of a high-impact polystyrene material and is approximately 0.030 inches in thickness. It is understood, of course, that the frame is adapted to accommodate posters and signs of many different materials and thicknesses. If the poster is made of high-impact polystyrene, a large sign of ten feet in length or more on each side will expand and contract one-half inch or more when exposed to extreme differences in temperature. The present invention is designed to accommodate such significant expansion and contraction. The slide member 80 "floats" in the frame section 24 and is constantly biased by the force of spring member 90. For example, if the sign panel 26 contracts due to cold temperatures, the contraction force in the sign material overcomes the designed force of the spring member 90 and allows the slide members 80 to move in the direction of the arrow 76. In this regard, the spring member 90 is normally made of a tempered spring steel material and is designed so that it has a spring force which can be overcome by the contraction forces imposed by the polystyrene material.

The contraction forces over a sign panel will cause the slide member to move in various directions. This is accommodated for by the fact that the spring mechanism 90 is allowed to slide or travel along the inside of the base member 28 along with the slide member 80 in the direction of the arrow 88. In this manner, when the poster display 26 contracts, the slide members 80 can move toward each other along the length of the frame section 24, as well as in the direction of the arrow 76. Since the movement will be in different directions, the slide members 80 are adapted to move in any direction 360° in a plane parallel to the plane of the sign panel 26.

When the sign panel 26 is subjected to high temperatures, it will expand, again in all directions. The biased and sliding operation of the combination of slide member 80 and spring member 90 allows all of the expansion to be accomodated in the frame section 24. This maintains a constant tension in all directions on the sign panel 26 regardless of expansion and contraction and thus maintains an unwrinkled and uniform advertising surface for display to the public.

The spring member 90 is installed in the frame section 24 in a preloaded condition. In the presently preferred embodiment, the display tensioning frame sections are designed so that the spring members 90 will exert an approximately 16 pound force when they are compressed to their maximum extent and provide an approximately five pound force when they are compressed to their minimum extent. When the frame section 24 is in the "open" position (as shown in FIG. 3), an approximately 11–12 pound force is provided by the spring member 90.

Preferably, a two-component leaf spring is used with the present invention. A thicker single component spring might be too stiff with too large of a spring rate, while a single thin spring component might have too high of a stress level to provide the necessary spring force and durability.

An alternate embodiment for the leaf spring member is shown in FIG. 5 and is designated generally by the number 122. The leaf spring 130 again has two components, a stiffening component 123 and an elongated bent component 124 which has a pair of ends which are bent backwardly to form U-shaped channels 126 and 128. In order to decrease and minimize the friction between the spring member 122 and the side member 46 of the base member 28, antifriction materials such as high molecular weight polymer tape 129 are positioned on each of the channel portions 126 and 128.

With the present invention, the sign panel 26 is maintained stretched and wrinkle-free regardless of the temperature and wind conditions, and also can be quickly and easily changed if desired. In order to change the sign panel 26, the person merely has to rotate each of the cover members 30 of each of the frame sections into their "open" positions. This automatically pushes the slide members in a position to reduce or minimize the tensioning force on the sign panel and allow the sign panel to be easily removed.

When the inventive frame 22 is used on a vehicle or other structure which will be subjected to significant wind forces, it is desired to prevent the wind from getting behind the sign panel 26. If strong wind forces get behind the sign, it could cause the sign to bow outwardly or inwardly from the trailer or supporting surface. Winds can be prevented from entering behind the sign panel by sealing the joint 250 between the frame section and surface with a sealing compound 252 or other appropriate means, such as a gasket. At the present time, it is preferred to seal only the windward edge of the sign frame.

Figure 6:
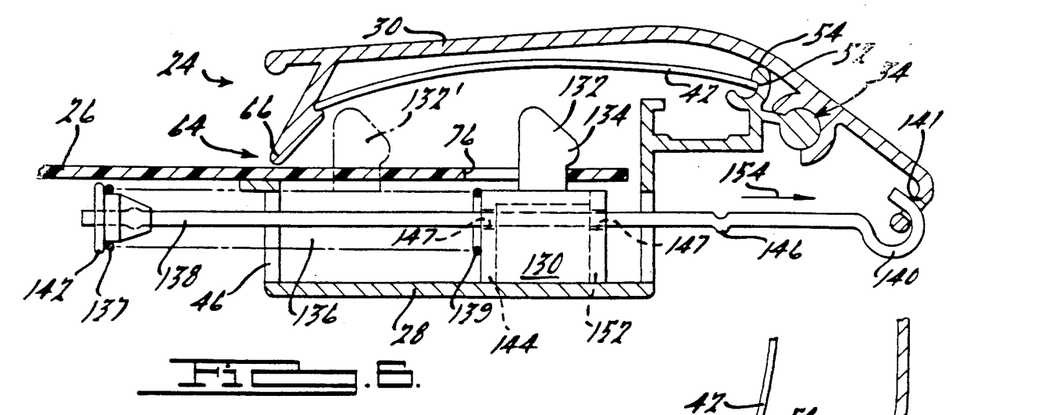
FIG. 6 is a cross-section of an alternate embodiment of the present invention which utilizes an alternate spring-tensioning mechanism.
Figure 7:
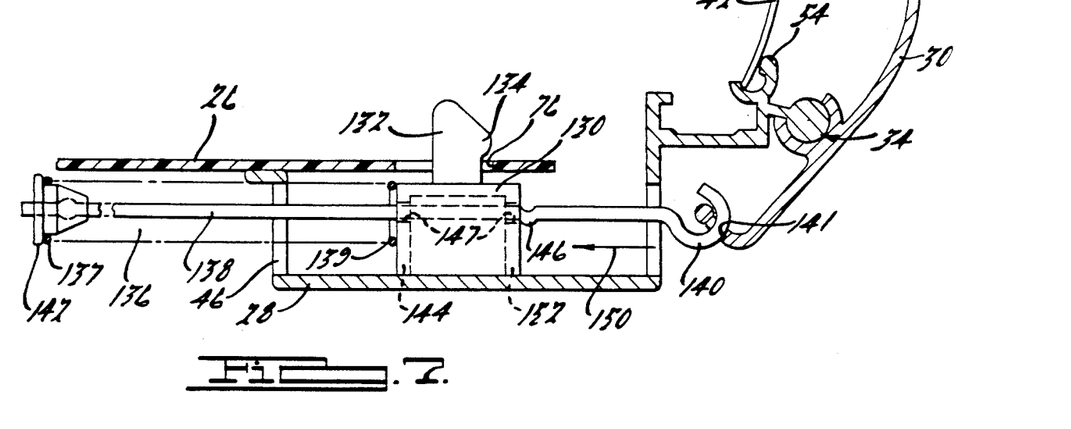
FIG. 7 illustrates the sign frame embodiment of FIG. 6, but in the open position.
Figure 8:
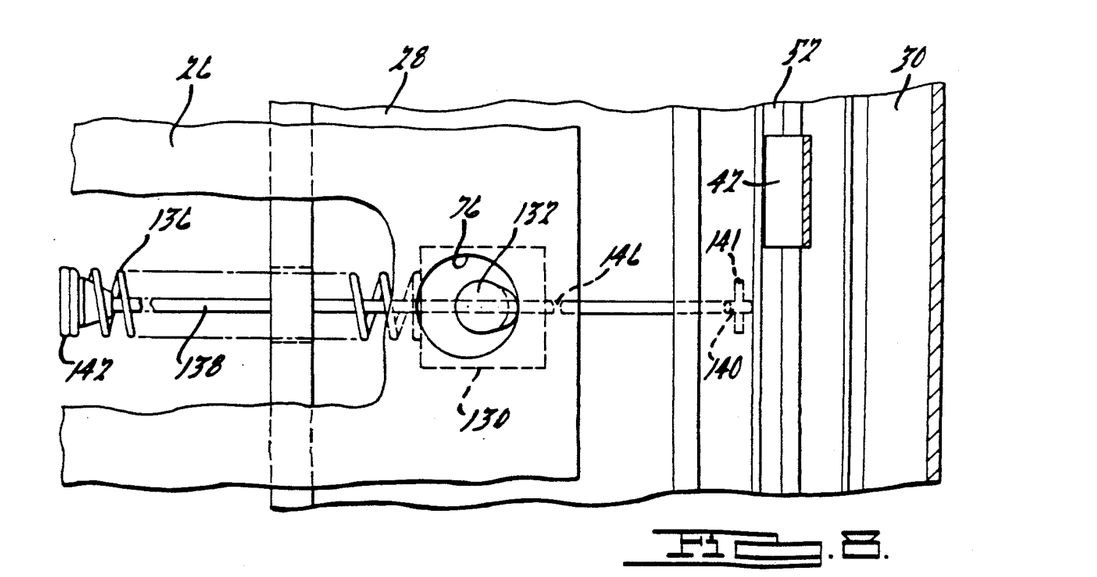
FIG. 8 is a partial top plan view of the sign frame embodiment shown in FIGS. 6 and 7.

FIGS. 6–8 show an alternate embodiment of the frame section 24. The frame section 24 has a base member 28 and a cover member 30 that are pivoted together by a ball and socket mechanism 34 which is similar to that as described above with reference to FIGS. 2 and 3. The base member 28 and cover member 30 are also biased together by a leaf spring member 42 in the same manner as that discussed above. The primary difference between the embodiment of FIGS. 6–8 and that of the FIGS. 2–4 is in the structure of the slide member and the spring biasing mechanism used to apply tension to the sign panel 26. In FIGS. 6–8, the slide member is generally designated by the reference numeral 130. The slide mechanism 130 has a post 132 extending upwardly thereon which is adapted to be inserted through the holes 76 in the edge of the sign panel 26. The post 132 has a backwardly extending lip 134 on it for holding the sign panel 26 in place when it is first mounted on the post. The biasing member of this embodiment comprises a coil spring member 136. The coil spring is mounted along a sliding pin member 138 which is attached by a hook 140 at one end to the cover member 30. The hook 140 is positioned in opening 141 in the cover member. One end 137 of the coil spring member 136 is positioned against a stop member 142 at the opposite end of the pin member 138. The other end 139 of the spring member 136 rests against the wall member 144 of the slide member 130. The pin member 138 also has a stop member 146 thereon and the pin member 138 is slidingly positioned through appropriate openings in 147 the slide member 130.

In operation, the frame section 24 of FIGS. 6–8 is adapted to be rotated into open and closed positions which are biased by the over-center spring force caused by spring member 42. When the cover member 30 is moved toward its open position, it forces the pin 138 to move axially in the direction of the arrow 150 (shown in FIG. 7) and forces the stop member 146 against the wall member 152 of the slide member 130. As the cover member 30 continues into its fully open position, the stop member 146 pushes against the slide member causing it to overcome the force of the coil spring member 136 and move to the left in the direction of the arrow 150. When the slide member 130 and post 132 in the position shown in FIGS. 7 and 8, the frame section 24 is in position for insertion and mounting of the sign panel 26 therein.

When the cover member is rotated to its closed position, as shown in FIG. 6, the end 66 of the cover member is positioned relative to the sign panel 26 as shown leaving a slight gap 64. Stop member 54 on the base member 28 prevents the end 66 from striking the sign panel 26 when the frame section is closed. Also, when the cover member 130 is closed, the pin member 138 is moved in the direction of arrow 154 pulling the stop member 146 away from slide member 130 and thus allowing the force of spring member 136 to move the slide member 130 in the same direction as arrow 154. At this point, the slide member 130 is "floating" and will be positioned at the appropriate position accommodating the amount of expansion or contraction of the sign panel 26. The force of the spring member 136 is also predetermined to be less than the calculated force created by a plastic sign panel 26 such that in extreme cold weather when the sign panel is fully contracted, the post 132 can be moved to the position shown in phantom lines 132' in FIG. 6.

Figure 9:
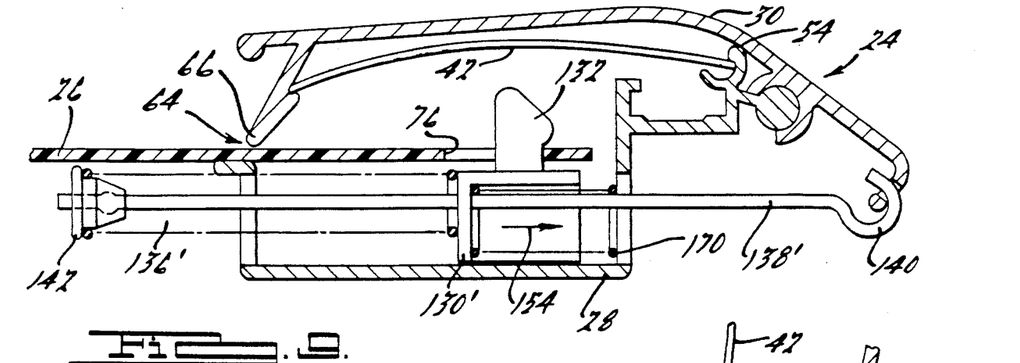
FIGS. 9 and 10 show an alternate embodiment of a display tension sign frame mechanism in accordance with the present invention.
Figure 10:
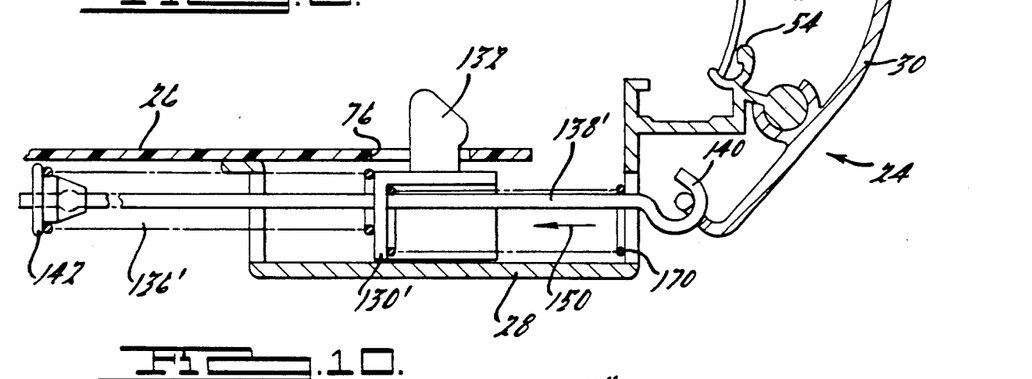

In FIGS. 9 and 10, another embodiment of the frame section 24 is provided which is slightly different than the embodiment shown in FIGS. 6–8. In this embodiment, the slide member 130' is biased on opposite sides by two compression coil springs. Coil spring member 136' is situated in the same manner and for the same purpose as coil spring member 136 of FIGS. 6–8. On the opposite side of the slide member 130', a second coil spring member 170 is positioned.

The two spring members 136' and 170 bias the slide member 130' in opposite directions and cause it to "float" in the channel formed in the base member 28. When the cover member 30 is opened, as shown in FIG. 10, the pin member 138' is moved in the direction of the arrow 150 thus reducing and equalizing the pressure on both springs allowing the slide member 130' to move also in the direction of the arrow 150.

When the cover member 30 is then removed to its closed position, as shown in FIG. 9, the movement of the pin member 138' due to the force caused by expansion of spring member 136' causes the slide member 130' to be forced in the direction of arrow 154. In this regard the expansion force by spring member 136' is designed to be greater than the compression force of spring member 170 and thus the slide member 130' and post member 132, are caused to move in the direction of the arrow 154. This situation places the sign panel 26 in tension.

The spring member 136' and 170 are also designed to allow the slide member 130' to "float" when the frame section 24 is in its closed position. The spring member 136' and 170 are designed such that the expansion and contraction of the sign panel 26 overcomes the dual force of the spring members 136' and 170 allowing the slide member 130' and post 132 to move and allowing the sign panel to remain unwrinkled and undamaged.

Figure 11:
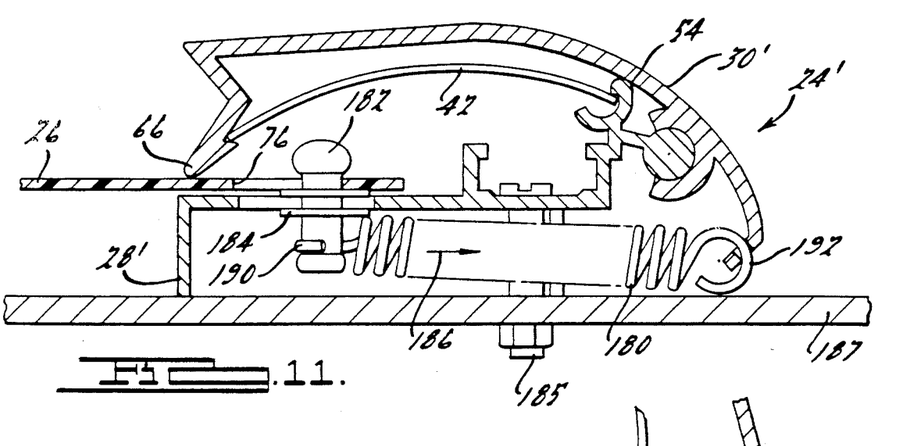
FIGS. 11 and 12 illustrate a still further embodiment of a display tensioning sign frame mechanism in accordance with the present invention.
Figure 12:
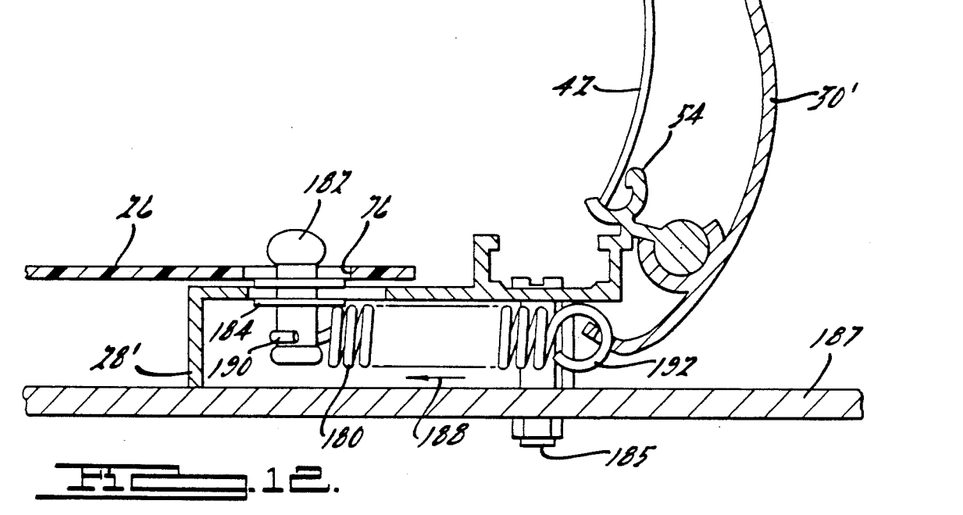

FIGS. 11 and 12 illustrate still another embodiment of the invention. In this embodiment, a single tension coil spring 180 is utilized and operates to move the post 182 and accompanying slide member 184. The cover member 30' is similar to that described above and operates in the same manner. While the base member 28' has a slightly different shape than base member 28 described above, it is similar and has the same purpose. For illustrative purposes, the frame section 24' is illustrated mounted by fasteners 185 to a planar surface or panel 187.

As can be seen by FIGS. 11 and 12, the closing of the cover member 30' expands the spring 180 and pulls the slide member 184 and post 182 in the direction of the arrow 186. On the other hand, when the cover member 30' is moved to its open position, as shown in FIG. 12, the spring 180 is allowed to contract (to its relaxed position), thus sliding the slide member 184 and post 182 in the direction of the arrow 188.

The coil spring 180 has a hook member at each end, one hook 190 attached to the post and slide member 184 and the other hook 192 attached to the cover member 30'. The embodiment of the invention shown in FIGS. 11 and 12 is designed to operate in the same manner as the other embodiments described above and holds the sign panel 26 in tension in the frame and yet allows it to compensate for thermal expansion and contraction and wind forces without allowing the sign panel to split or buckle.

Figure 13:
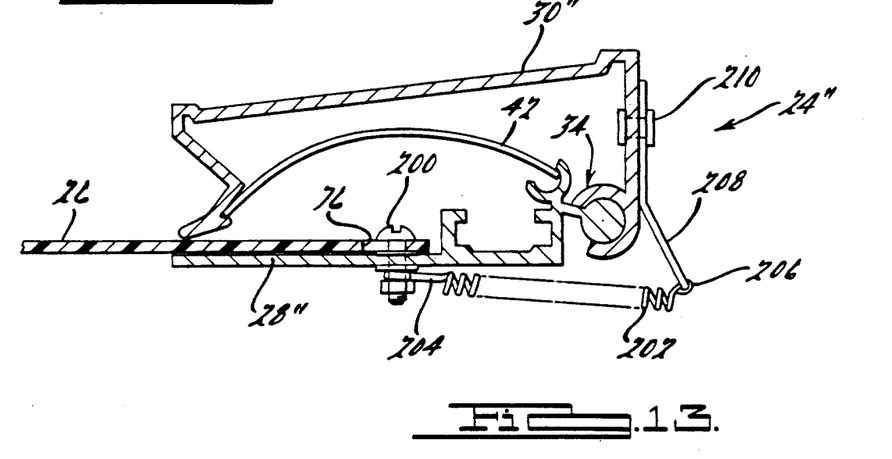
FIG. 13 depicts another embodiment of the invention.
Figure 14:
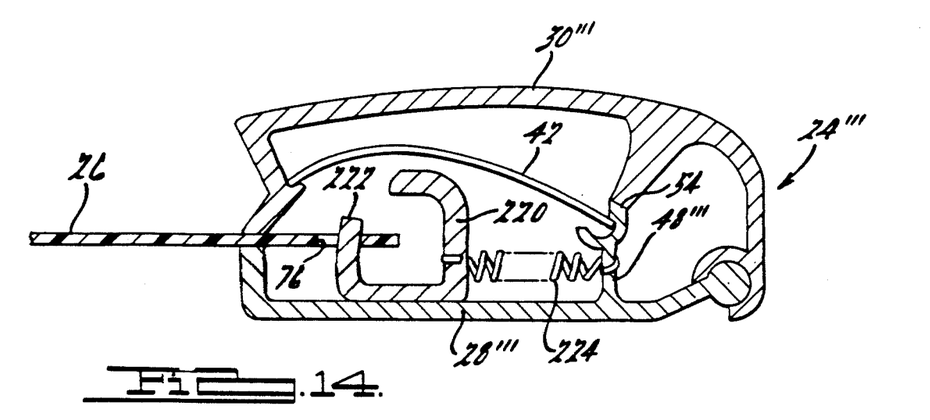
FIG. 14 shows still another embodiment of the invention.

Other embodiments of the invention which operate in a similar manner to achieve similar results are shown in FIGS. 13 and 14. In FIG. 13 the slide member is essentially comprised of a small fastening member 200 which is biased by a coil spring 202. The coil spring 202 is attached at one end 204 to the fastening mechanism 200 and attached at its other end 206 to a lever member 208. The lever member 208 is secured by pop rivets or other mechanical means 210 to the cover member 30.

As can be seen by a review of FIG. 13, the embodiment shown operates in a manner similar to the embodiment shown in FIGS. 11 and 12. One difference in operation of the embodiment shown in FIG. 13 from that of FIGS. 11 and 12, however, is that no stop is provided to prevent the cover member 30'' from resting against the sign panel 26 when the frame section 24'' is in the closed position.

FIG. 14 illustrates still another embodiment of the invention. The cover member 30''' is generally the same as the other cover members described above, although the base member 28''' is different in shape but the same in concept and purpose as the base members described above. The slide member 220 has an open channel shape with a series of upright post members 222 thereon which mate with the openings 76 and the sign panel 26. The slide member 220 is resiliently mounted by coil spring 224 which is attached at one end directly to the slide member 220 and at the other end to rear wall 48''' of base member 28'''.

The operation of the embodiment shown in FIG. 14 is similar to the embodiments described above, although the slide member 220 does not move or slide automatically when the cover member 30''' is opened or closed. Instead, the slide member 220 is moved manually in order to mount and insert the sign panel 26 in the frame section. The coil spring 224, however, allows the slide member 220 to "float" in the channel formed in the base member 28''' and thus to compensate for thermal expansion and contraction of the sign panel 26.

FIGS. 15 and 16 illustrate the use of the present invention in a backlighted sign display device. The device is generally indicated by the reference numeral 260. The device is basically a large six-sided rectangular box with a backing member 262, four side panels 264 and a sign panel 266 held in place by a frame 268 composed of four frame sections 270. The backing member and side panels can be made of any strong, structural materials, such as aluminum or other sheet metal. It is also possible for the side panels to be extruded as part of a frame section 270.

The plurality of florescent lighting fixtures 272 are positioned in the device 262 and connected by appropriate circuitry and switches (not shown) to light up the inside of the device. The sign panel 266 is made transparent or translucent and preferably is made of a high impact polystyrene (the same as sign panel 26 described above). The light from the fixtures 272 lights up the panel 266 and highlights the message thereon.

The frame sections 270 are tensioning mechanisms in accordance with the present invention and can be the same as any of the embodiments discussed earlier. Preferably, however, the frame sections 270 comprise the embodiment shown in FIGS. 2-4 or FIGS. 11 and 12. In FIGS. 15 and 16 frame section 270 is the same as frame section 24' of FIGS. 11-12 and operates in the same manner.

While it will be apparent that the preferred embodiments of the invention disclosed are well calculated to fulfill the objects above stated, it will be appreciated that the invention is susceptible to modification, variation and change without departing from the proper scope or fair meaning of the appended claims.

I claim:

1. A display frame for holding a sign panel in tension therein, said frame being formed of a plurality of frame sections, each of said frame sections comprising,
    a base member,
    a cover member rotatably connected to said base member for movement between relatively open and closed positions,
    slide means positioned in said base member, and having means thereon for holding and tensioning said sign panel, and
    means for biasing said slide means in a direction to place said sign panel in tension,
    wherein said slide means is responsive to the position of said cover member to decrease the tension on said sign panel when said cover member is rotated to said open position and to increase the tension on said sign panel when said cover member is rotated to said closed position.

2. The display frame of claim 1 further comprising second biasing means extending between said cover member and said base member and acting to bias the former with a snap-over action between a closed position to hold said sign panel in place and an open position to removably remove said sign panel.

3. The display frame of claim 1 wherein said means on said slide member for holding said panel comprises a post means, and said sign panel has corresponding means for being mounted on said post means.

4. The display frame of claim 1 wherein said biasing means comprises a leaf spring mechanism.

5. The display frame of claim 1 wherein at least two slide means and two biasing means are provided in each frame section.

6. The display frame of claim 1 wherein said biasing means has anti-friction means thereon for ease of sliding movement in said base member.

7. The display frame of claim 1 further comprising stop means to prevent said cover member from resting on said sign panel.

8. A display frame of claim 1 wherein said cover member rotates from an open position to a closed position, and means are provided for moving said slide means to a prespecified position when said cover member is rotated to said open position.

9. The display frame according to claim 1 wherein said slide means is biased for movement to acompensate for thermal expansion and contraction of said sign panel when said cover member is in said closed position.

10. The display frame for holding a sign panel along an edge thereof according to claim 1 wherein said sign panel is placed in tension simultaneously along the length of said edge when said cover member is moved to said closed position.

11. The display frame for holding a sign panel along an edge thereof according to claim 1 wherein said sign is placed in tension along the length of said edge when said cover member is in said closed position and wherein said tension along said edge is simultaneously relieved when said cover member is moved to said open position.

12. A closure device for holding and displaying a sign panel, said closure device comprising,
a first member,
a second member rotatably attached to said first member for movement between a first position and a second position.
a third member positioned in said first member and having means for holding said sign panel, and
biasing means for applying a tension force on said sign panel,
wherein said third member is responsive to the position of said second member to automatically decrease the tension force on said sign panel when said second member is moved toward said first position and to automatically increase the tension force on said sign panel when said second member is moved toward said second position.

13. A display frame for holding a sign panel in tension therein, said frame comprising a plurality of frame sections and said sign panel having a plurality of edges with at least one attachment means along each of said edges, each of said frame sections comprising,
a base member,
a cover member rotatably connected to said base member for movement from a closed position covering at least a portion of one of said edges of said sign panel to an open position allowing removal and change of said sign panel,
slide means positioned in said base member and having connecting means thereon for mating with said attachment means on said side panel and for holding said sign panel in place, and
means for biasing said slide means in a first direction to release the tension on said sign panel and in a second direction to place tension on said sign panel, said connecting means being responsive to the position of said cover member for movement to a first position when said cover member is moved to said open position and to a second position when said cover member is moved to said closed position, and said sign panel being placed in tension simultaneously along the length of one of said edges when said cover member is moved to said closed position.

14. The display frame according to claim 13 wherein said sign panel is relieved of tension simultaneously along said length when said cover member is moved to said open position.

15. The display frame according to claim 13 further comprising a plurality of slide means positioned in said base member, each slide means having mating means for holding said sign panel and each slide means being responsive to the position of said cover member.

16. The display frame according to claim 13 wherein at least two of said frame sections include a plurality of said slide means.

17. The display frame according to claim 13 wherein each of said frame sections includes a plurality of said slide means.

18. The display frame according to claim 13 wherein said slide means is biased for movement to compensate for thermal expansion and contraction of said sign panel when said cover member is in said closed position.

19. A frame for holding and displaying a panel therein, said panel having at least one edge and said frame having at least one frame applying tension to said panel, said frame section comprising,
a first member,
a second member pivotably connected to said first member and moveable between a first position and a second position,
shuttle means associated with said first member and moveable relative thereto,
connecting means on said shuttle means for holding said panel adjacent said edge, and
means biasing said shuttle means in a direction to place said panel in tension,
wherein movement of said member toward said first position automatically moves said shuttle means against the force of said biasing means to decrease the tension in said panel and position said connecting means in a prespecified position, and wherein movement of said second member toward said second position allows said biasing means to move said shuttle means and increase the tension on said panel.

20. The frame of claim 19 wherein said shuttle means is in a free-floating biased condition when said second member is moved to said second position and wherein said frame compensates for thermal expansion and contraction of said panel.

21. The frame of claim 19 wherein said panel is placed in tension simultaneously along the length of said edge when said second member is moved to said second position.

22. The frame of claim 19 wherein the tension in said panel is relaxed when said second member is moved to said first position and said connecting means is placed in said prespecified position.

23. The frame of claim 19 wherein a plurality of shuttle means are provided in said second member along the length of said edge of said panel and wherein all of said shuttle means are moved simultaneously to a prespecified position when said second member is moved to said first position.

24. The frame of claim 19 wherein four frame sections are provided forming a rectangular shape, said sign panel is rectangular in shape with four edges, and said sign panel is held in tension along each of said edges.

25. The frame of claim 19 wherein four frame sections are provided and said panel has four corresponding edges.

26. A device for holding a sign panel in tension along an edge thereon, said device comprising, first means for holding and biasing said sign panel along said entire edge, and second means for automatically moving in a first direction said first means simultaneously along said edge to release the tension in said sign panel and allowing it to be removed if desired, and for automatically moving in a second direction said first means simultaneously along said edge to create tension in said sign panel.

* * * * *

UNITED STATES PATENT AND TRADEMARK OFFICE
CERTIFICATE OF CORRECTION

PATENT NO. : 4,580,361  Page 1 of 2

DATED : April 8, 1986

INVENTOR(S) : Kevin D. Hillstrom, et al.

It is certified that error appears in the above-identified patent and that said Letters Patent is hereby corrected as shown below:

| | |
|---|---|
| Column 1, line 4 | "division" should be --continuation--. |
| Column 1, line 42 | "heighth" should be --height--. |
| Column 1, line 46 | "similar" should be --smaller--. |
| Column 4, line 28 | "preferaby" should be --preferably--. |
| Column 4, line 47 | "hanging" should be --hinging--. |
| Column 8, line 55 | "accomodated" should be --accommodated--. |
| Column 9 line 62 | "along" should be --around--. |

UNITED STATES PATENT AND TRADEMARK OFFICE
CERTIFICATE OF CORRECTION

PATENT NO. : 4,580,361

DATED : April 8, 1986

INVENTOR(S) : Kevin D. Hillstrom, et al.

It is certified that error appears in the above-identified patent and that said Letters Patent is hereby corrected as shown below:

| | | |
|---|---|---|
| Column 10, | line 17 | Insert "are" after --132--. |
| Column 10, | line 59 | "removed" should be --moved--. |
| Column 12 | line 20 | "florescent" should be --fluorescent--. |
| Column 12 | line 68 | Insert "sign" after --said-- (second occurrence). |
| Column 13 | line 20 | "acompensate" should be --compensate--. |
| Column 13 | line 41 | Delete "." and insert --,--. |
| Column 13 | line 67 | "side" should be --sign--. |

Signed and Sealed this

Twenty-fourth Day of February, 1987

Attest:

DONALD J. QUIGG

Attesting Officer     Commissioner of Patents and Trademarks